March 14, 1972   J. D. WALKER   3,649,529
COMPLETE MIX SEWAGE TREATMENT SYSTEM
Filed Jan. 23, 1969   3 Sheets-Sheet 3
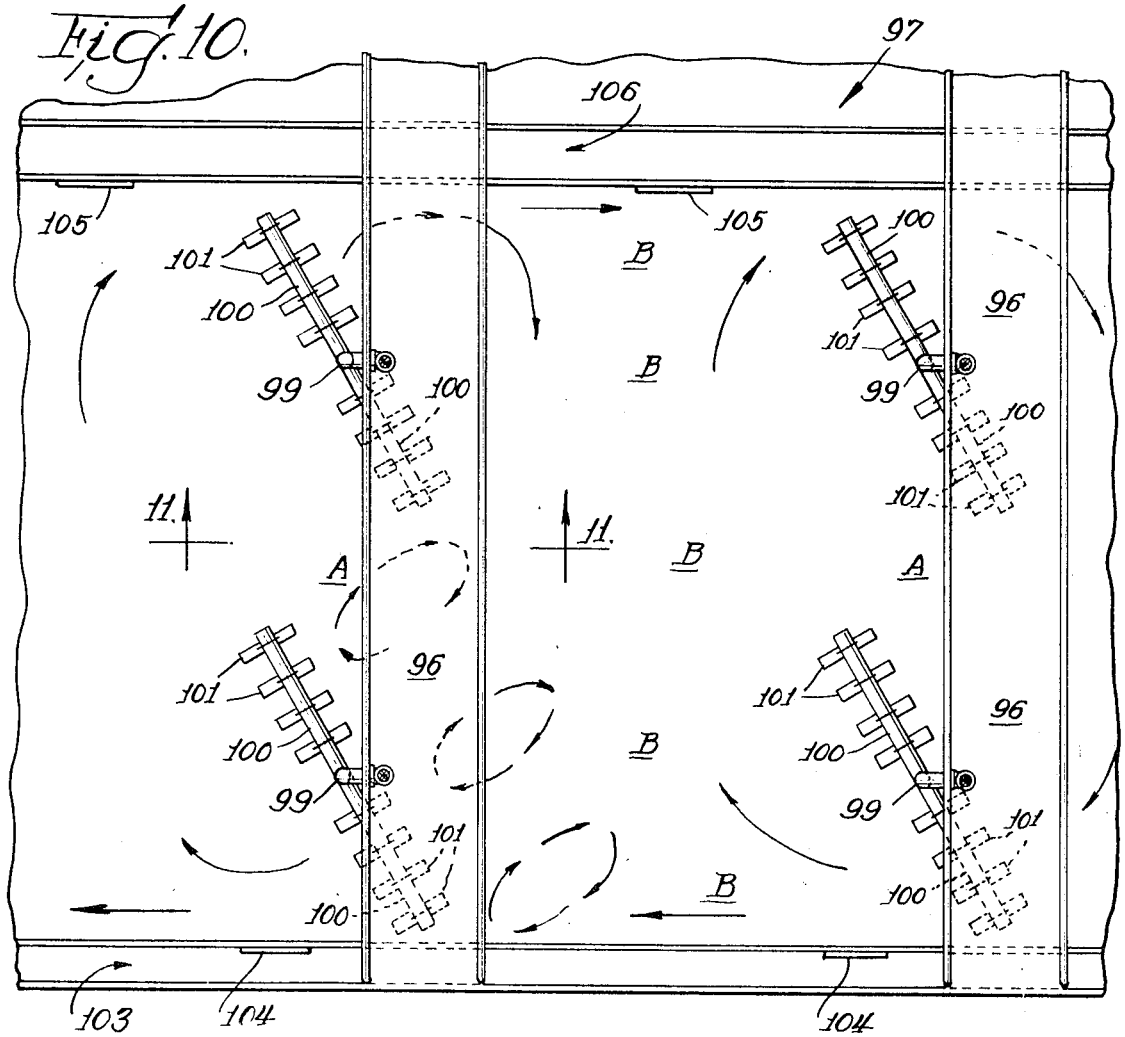
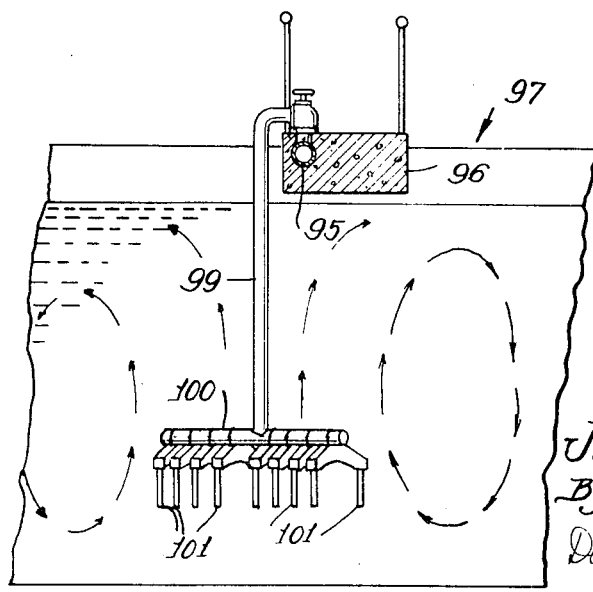
Inventor
James Donald Walker
By
Dorbo, Robertson & Vandenburgh
Attys.

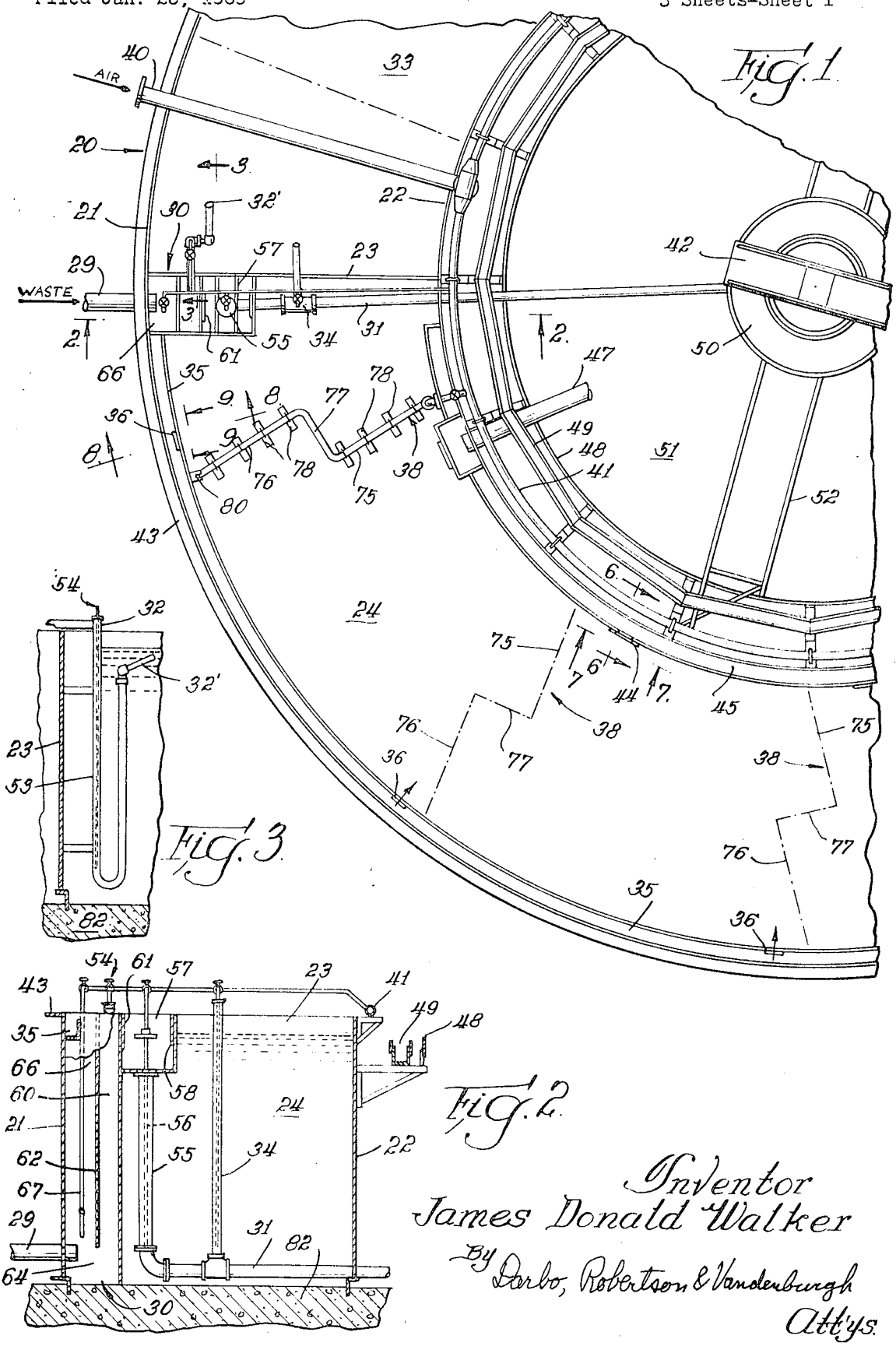

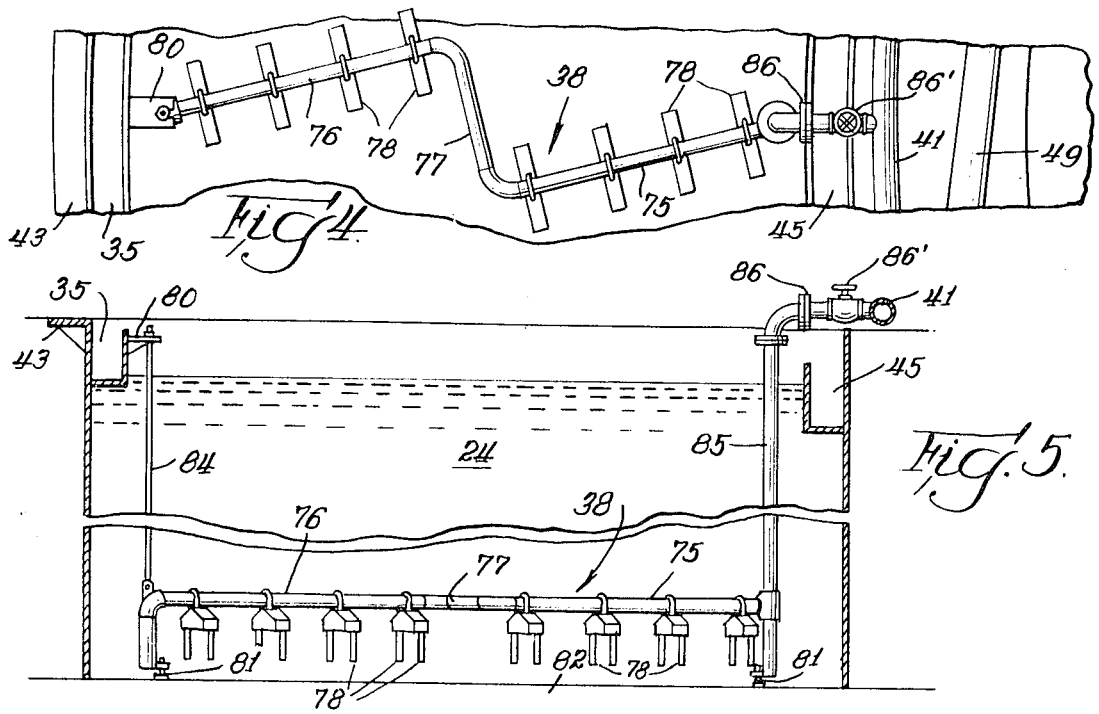
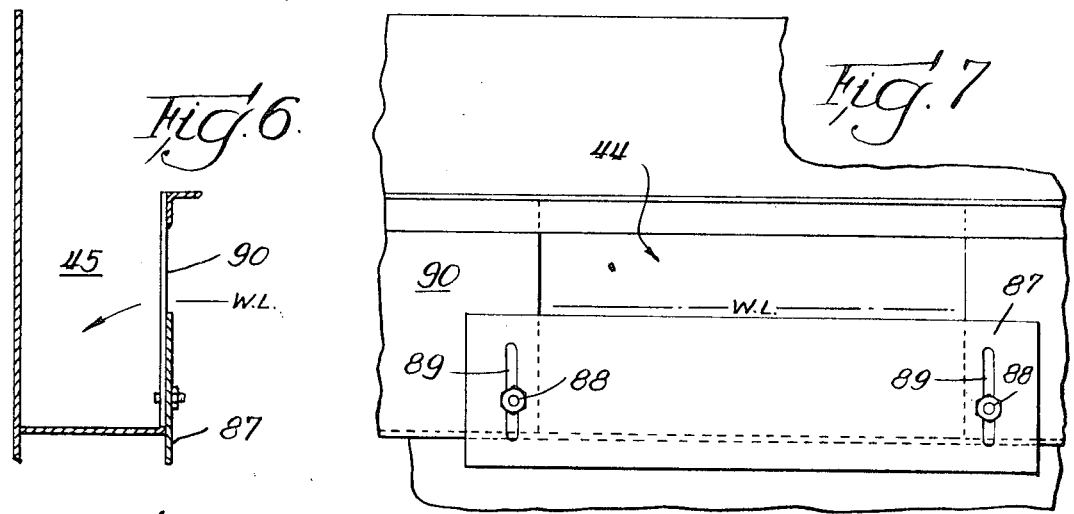
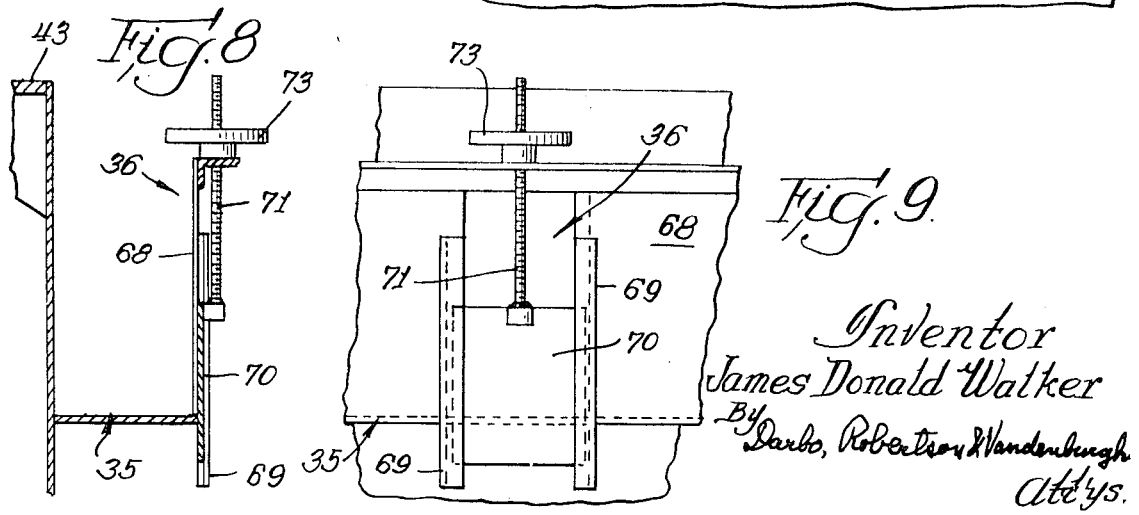

United States Patent Office 3,649,529
Patented Mar. 14, 1972

3,649,529
COMPLETE MIX SEWAGE TREATMENT SYSTEM
James Donald Walker, Aurora, Ill., assignor to Chicago Bridge & Iron Company, Aurora, Ill.
Filed Jan. 23, 1969, Ser. No. 793,446
Int. Cl. C02c 1/12
U.S. Cl. 210—4
11 Claims

ABSTRACT OF THE DISCLOSURE

In an activated sludge sewage aeration system, aeration, mixing, and uniformity throughout a tank, are improved by liberating air along lines positioned to generate in the contents of the tank, rolls having their axes on a bias, that is, neither parallel to nor perpendicular to the tank walls or to the "general direction of flow" of the processed liquid. Preferably using a tank thus mixed, the known advantages of "complete mixing" are achieved, and may be enhanced, by feeding an intimate mixture of raw sewage and return activated sludge to the tank at feed points so scattered that no part of the tank is far from a feed point.

BACKGROUND OF THE INVENTION

In the treatment of sewage, activated sludge systems have long been regarded as the best method of treatment. In such systems, raw sewage is mixed with activated sludge and aerated until, by aid of the bacterial organisms in the activated sludge, nearly all of the organic matter in the sewage is oxidized, or otherwise converted to a state at which it can be settled out. The plant effluent, appearing as a clear relatively unobjectionable water, may then be discharged into a stream, perhaps after being treated with chlorine. The polluting power, measured as BOD (biochemical oxygen demand) is typically reduced 90 to 95%. Conventional activated-sludge systems for the treatment of sewage have usually been designed to provide an aeration period of four hours or more to achieve the 90 to 95% BOD reduction in normal domestic and industrial sewage. For some years there has been recognition that at least theoretically, as in laboratory or small "pilot plant" tanks, equal BOD reduction could be achieved with much shorter detention periods. See "Complete Mixing— Something for Nothing," McKinney, 34 Civil Engineering, September 1964, 48–50. See also Eckenfelder et al., "Kings College Symposium on the Treatment of Waste Waters" 2:156–187, 1960. In essence, the "complete mix" activated sludge system is a system in which the incoming waste and return sludge streams are quickly dispersed throughout the entire contents of an aeration tank. Thus, the composition of the tank contents is relatively the same throughout, and is substantially the same as the tank outflow. Also "shock loads" or sudden increases of raw sewage are less harmful, being diluted throughout the whole tank instead of being concentrated at the input end of the tank.

Even though theoretical considerations teach the desirability of a truly "complete mix" system, and even though the experience to date with "complete mix" activated sludge systems of laboratory size has been most gratifying, applying the theory to full scale working plants presents a severe problem of distribution and mixing. It has long been apparent that raw influent and return sludge supplied at one end of a conventional long tank will not be quickly and uniformly distributed throughout the tank. Indeed the theory in designing such tank has been quite the opposite, for the reacting mass to move slowly from feed end to discharge end. For example, in one of the widely used systems of the prior art commonly referred to as the "spiral flow" system, the contents of the aeration tank are moved in the pattern of a large horizontal roll caused by the rising of air which is injected into the tank along one of its long sides. The general direction of the flow of the liquid, i.e., the movement from influent to effluent regions of the tank was lengthwise of the tank. The theory was that flow would be helical, for maximum treatment time. If such helical path were followed, great oxidizing activity occurred near the feed end but it tapered off so that the last half of the tank was relatively useless. Sometimes the raw waste did reach the outflow end of the tank relatively quickly, by "short circuiting" along the tank-long axis of the roll; but then it was relatively unmixed and hence objectionable raw sewage was found in the effluent.

At least two long-used developments reduced the tapering-off of the oxidizing activity. In one, called "step aeration" only the return activated sludge was fed to the tank at its inlet end, the waste being added at a plurality of points along the length of the tank, but still all of the flow was intended to be along the helical path and toward the outflow end. The tank contents were usually far from uniform.

In another system, heretofore available, the general direction of flow of the process liquor was in a direction which is perpendicular to the axes of a plurality of rolls generated in the tank by rising gases injected into the processed liquor along transverse lines. The latter system is commonly referred to as a cross roll system. Here there was back and forth, forward and reverse, mixing flow. The successive rolls peripherally mingled, and some inflow, well mixed with return sludge and tank contents, quickly reached the out flow end of the tank; but not enough to achieve a uniform-throughout condition. Nevertheless, the "cross roll" system is highly efficacious with respect to intermixing the contents of the tank and among promoted designs provided what might be considered the best prior approximation of a "complete mix" system.

It is an object of this invention, however, to provide a simple system, suitable for commercial or full-size tanks, which provides very nearly a truly uniform-throughout condition. It is a further object of this invention to provide an exceptional degree of intimate mixing of sewage being treated and the treating agents.

SUMMARY OF THE INVENTION

These and other objects which will be apparent hereinafter are all achieved in accordance with this invention by the combination of multi-point feeding of intimately premixed sewage and return sludge and vigorous diverse-flow mixing within the tank. In the tank, the air injection devices are arranged in a pattern such that rolls are generated which have their axes on the bias with respect to the general direction of flow of the processed liquor between the influent and effluent portions of the system.

DESIGNATION OF THE FIGURES

FIG. 1 is a fragmentary plan view of a portion of a circular activated sludge waste-water treatment system showing plural-point introduction of premixed feed, and one arrangement of the air injection means in an aeration tank, in accordance with this invention.

FIG. 2 is a sectional view broken away in part to a section approximately along the line 2—2 in FIG. 1, including the premix chamber.

FIG. 3 is a cross-sectional view taken approximately along the line 3—3 in FIG. 1.

FIG. 4 is an enlarged more detailed plan view of an air injection system in accordance with this invention.

FIG. 5 is a vertical cross-sectional view showing a side view of the air-injection apparatus of FIG. 4.

FIG. 6 is a cross-sectional view taken approximately along the line 6—6 of FIG. 1, showing an outflow weir.

FIG. 7 is a fragmentary elevational view taken along the line 7—7 of FIG. 1, showing the structure of FIG. 6 from its right.

FIGS. 8 and 9 are corresponding views showing an adjustable inflow gate, FIG. 8 being taken approximately along the line 8—8 of FIG. 1.

FIG. 10 is a fragmentary plan view illustrating an alternative embodiment of this invention in a substantially rectangular process tank, with bridges.

FIG. 11 is a fragmentary cross-sectional view taken approximately along the line 11—11 in FIG. 10.

DESCRIPTION OF PREFERRED EMBODIMENTS

Although the following disclosure offered for public dissemination in return for the grant of a patent, is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

FIGS. 1 through 9 illustrate the use of this invention in conjunction with a circular processing system common in "package" treatment plants. This system includes a circular tank system, generally 20, having an outer wall 21 and an inner wall 22. Radial partition walls 23 seal off and divide the outer portion of the circular system between outer wall 21 and inner wall 22 into discrete compartments or tanks. The general flow of sewage is from inflow line 29, through premix section 30, through aeration tank 24 to settling tank or clarifier 51. Clear effluent from that tank flows under skimmer ring 48 and overflows into trough 49 and is discharged to a stream, perhaps with further treatment not shown. The sludge settling in tank 51 is drawn off through pipe 31. Some flows through air-lift unit 34 into aerobic digestion tank 33 where the solids are made relatively unobjectionable. The remainder of sludge from line 31 has conventionally been used to "seed" the raw sewage with useful bacteria and is called "return activated sludge." Thus the process gets its name, the activated sludge process.

According to the present invention, return activated sludge from line 31 is vigorously mixed with the raw sewage in premix section 30 and the activated mixture flows through distribution flume 35 to enter tank 24 at a plurality of feed points 36. These are located along a long side of tank 24 so that every point of the tank is only a short distance away from a feed point, although the location of air liberation prevents any concentrated flow to the outflow without extensive mixing within tank 24. Thus, raw sewage inlet 29 empties into a premix section generally 30. Sludge return line 31 permits introduction of a return portion of the activated sludge, settled in clarified 51, to be introduced into the premix section 30. If desired, supernatant liquor drawn by decanting equipment 32 from digestion tank 33 may also be discharged into mixing section 30. Also chemicals can be fed in at this point, as for phosphorus removal. Premixed sewage-sludge liquor, an activated sewage mixture, leaves the premix section 30 by way of trough or distribution flume 35 which extends substantially the entire length of tank 24. The activated mixture is discharged from trough 35 into tank 24 at uniform rates through a plurality of feed gateways 36. The liquid in tank 24 is kept in motion as described below, with diverse flow directions. A large quantity of air is introduced into the liquid in tank 24 by means of a multiplicity of openings situated along air headers, generally 38. These air headers are supplied through air supply pipe 40 and manifold section 41. The configuration and construction of air headers 38 will be discussed in greater detail below. They are removed for servicing by conventional equipment, not shown, on rotating bridge 42, which rides on track 43. Liquid leaving tank 24 is collected by way of discharge gateways 44 and trough or collection flume 45, and led to inner tank 51 where solids are settled. Thus, the overflow or effluent from tank 24 is introduced through conduit 47 to the centrally located inflow distribution structure 50 of inner tank 51. Sludge is collected at the bottom of inner tank 51, and this may be aided by rotating collector arms 52.

Details of some of the structures generally referred to above will now be discussed. The supernatant decanting means illustrated in detail in FIG. 3 includes an adjustable intake section 32' and lift leg 53. An air injection means 54 is used to lift the supernatant over radical wall 23 for discharge into premix section, generally 30.

Vertical air-lift leg 55 for return sludge is fitted with an air pipe 56 having a sparger at its bottom, to raise return sludge which discharges into box 57 of premix section 30. Return sludge discharged into box 57 can be diverted directly to tank 24, if weir gate 58 is provided. Normally, however, the contents of box 57 are discharged into downward leg 60 of premix section 30. Control may be provided by weir gate 61. Baffle 62 directs the sludge (and supernatant decant liquor, if supplied) into the bottom region 64 of mix section 30 into which raw sewage is introduced through influent pipe 29. The resulting mixture is simultaneously raised and vigorously stirred in upwardly extending chamber 66 of premix section 30 by air released from one or more spargers at the foot of air supply pipe 67. Enough air is released to achieve a high degree of intimate mixing with resulting particle-to-particle contact between sewage solids and the activated "seed" sludge. To this end violent agitation is desired, e.g., a turbulence equivalent to a velocity gradient of the order of 200 effective for 30 seconds or 700 for 5 seconds, or more. The velocity gradient here used is in terms of feet per second per foot. This is in contrast to mild mixing of sewage and return sludge in inflow channels sometimes provided heretofore, which was likely to be equivalent to a velocity gradient of only about 15. To avoid using much space or energy, a very short detention period is preferred in premixing chamber 66, not over ½ minute with "rated" flow rates; although up to two minutes would probably not be deemed prohibitively wasteful. The flow of the premixed process material from distribution flume 35 through weir gates 36 is regulated for uniformity by appropriate adjustments of the gates shown in greater detail in FIGS. 8 and 9. Vertical wall 68 of flume 35 is fitted with gate-retaining elements 69 which retain vertically movable feed gates 70 against vertical wall 68. The precise vertical position of each movable feed gate 70 is adjustable by means of the screws 71 turning handle 73. The latter structures are perhaps best illustrated in the schematic presentation of FIGS. 8 and 9.

Air injection header assemblies, generally 38, illustrated in the embodiment shown in FIGS. 1 through 9 include three distinct horizontal sections, namely, two elongated linear header sections 75 and 76 situated adjacent inner wall 22 and outer wall 21 respectively, and median connector section 77, which connects sections 75 and 76. A large number of gas injection outlets arranged in clusters 78, are situated along headers 75 and 76 and optionally along section 77. The header assemblies 38 are secured to the equipment at one end of each by brackets 80 which are fixed to the inner vertical wall 68, and positioned by foot bolts 81 which rest on the floor 82 of tank 24.

During installation, foot bolts 81 are adjusted to make the header dead level. Vertical rod 84, and vertical leg 85 of the air supply system, provide means for lifting air header assembly 38 from tank 24 for inspection, and for cleaning if necessary. Either quick opening couplers or flanges 86 are provided for convenience in separation of the header assembly 38, and its attached components from air supply manifold 41. Valves 86' are preferably situated between flanges 86 and manifold 41. Two-stage hoisting facilities (not shown) are provided as taught by Walker Pat. 3,339,901, in this instance using two double-winch hoists, one for rod 84 and one for pipe 85.

It is noted that header assembly 38 is situated near but well above floor 82 of tank 24 to facilitate the movement of water in the tank to the region of header 38. Header sections 75 and 76 are sufficiently elongated to generate a roll. Also, header assemblies 38, are spaced apart from each other a sufficient distance to permit development of a double roll extending away from each header 38. The double roll is formed by the mass of liquor rising with the stream of injected air bubbles rising above header 38. This causes a substantial flow of liquid in both directions away from the region of the headers at the top of the tank contents. When the outwardly moving liquid meets a wall or an on-coming flow, it moves downward. At the bottom, it is drawn toward the header to replace fluid moved upward from below header 38, the overall pattern being referred to as a "roll." This is distinguished from patterns in which the liquid is raised and drawn down in tight regions or columns.

It is particularly noteworthy that in accordance with this invention, the gas injection orifices are arranged in a pattern along lines which are on the bias with respect to the general direction of displacement flow of the liquid being processed. As used herein, the terms "general direction of displacement flow" of liquid being processed means the general direction which liquid from the input tends to flow while no air is released in the tank 24. Thus, the "general direction of displacement flow" of the liquid being processed in tank 24 is along the radii between outer wall 21 and inner wall 22. Each of header sections 75 and 76 are situated on the bias with respect to the radial lines. Shorter intermediate sections 77 are also on bias with respect to the radial lines. Preferably the air injection orifices are situated only along sections 75 and 76, with section 77 merely forming a connecting means to convey air into section 76. In this embodiment two separate sets of double rolls are generated by each of the headers, generally 38. This causes a region of extreme turbulence between the rolls and at the surface immediately above section 77.

The pairs of double rolls generated by headers 75 and 76 co-act with the walls of tank 24 as well as with each other to bring about a degree of mixing heretofore unavailable in activated sludge processing equipment. It will be appreciated that a roll formed on the side of header 75 or 76 which is in an acute angle formed by the wall and the header will continuously thrust liquid against the wall with varying degrees of vigor depending on the distance between the wall and the point above the portion of the header section involved. On the other hand, the roll formed in the region between the header and the wall which constitutes an oblique angle tends to move the majority of the water in the roll somewhat outwardly from the wall thus enhancing the formation of numerous eddies along the wall in that region. Moreover, the positioning of the headers 75 and 76 on the bias with respect to the radius of the circular tank results in the formation of rolls having axes and lines of thrust which are also on the bias with respect to the axes and lines of thrust of other rolls formed by the next adjacent headers.

The division of the flow of effluent liquor from tank 24 among its outlets is controllable by adjusting the height of movable gates or weirs 87, after loosening nuts 88. The slots 89 permit movement to a position higher or lower on vertical wall 90 of trough 45.

A SECOND PREFERRED EMBODIMENT

In embodiment illustrated in FIGS. 10 and 11, preferred for larger plants, air supply pipe 95 is located along or imbedded in reinforced concrete bridge 96 which serves as a crosswalk over substantially rectangular tank 97. Air is conveyed from air supply pipe 95 through vertical pipe 99 to the middle of headers 100. Headers 100 serve to inject air into the liquid through a multiplicity of cross elements 101 each having two clusters of openings or outlets through which air is discharged into the liquid, one cluster at each end. However, the overall pattern of rising air from each header section is an elongated, substantially linear pattern. As air is injected, a double roll, one on each side of the header 100, is generated in the liquid at each header. Extremely vigorous agitation occurs in the regions between the most closely adjacent headers and along the wall on the side of the header at which the wall forms an acute angle with the header.

The raw sewage and return activated sludge, which are first premixed in a premix section which is similar to that shown in connection with the circular tank are introduced into tank 97 by way of trough 103 through a multiplicity of weirs or feed gates 104. The tank contents discharge through weir gates 105 and trough 106. In the embodiment illustrated in FIG. 10 the general direction of displacement flow of the processed liquid is a line perpendicularly between the influent side of the tank shown at the bottom of FIG. 10 and the effluent side of the tank shown at the top of FIG. 10. It is noted that the pattern formed by the air injection orifices on each of the headers 100 are situated on the bias with respect to the general direction of movement of the processed liquor and that the axes of the rolls generated by these headers 100 are also on the bias with respect to the so-called general direction of displacement flow of the process liquid. It is understood of course that during treatment, while air is being liberated in the tank, none of the process liquid actually moves along a straight line between the influent and effluent side, because the entire contents of the tank are subjected to an extremely high degree of vigorous intermixing due to the action of the apparatus of this invention.

In all cases, the bias of the headers should be substantial, i.e., enough to provide diverse flow. It is believed that the angle of bias should be at least 15 degrees. Thus the angle should be at least 15 degrees from the general direction of displacement flow (in either direction from that line) and at least 15 degrees from the line perpendicular to that direction. A bias of about 30 degrees would be preferred hydraulically, and is the present plan. For ease of handling the headers from conventional bridges some designers may prefer to approach a bias angle of 15 degrees, below which point a decrease in severity of localized turbulence seems to be noticeable. A bias angle of 10 degrees may still be using the invention, but poorly. Because the general direction of displacement flow is usually perpendicular to and parallel to respective walls of the tank the positioning of the aeration headers and resulting rolls on the bias with respect to the general direction of displacement flow of the process liquor results in their being also on the bias with respect to the direction of the wall structures of the tank. This is in itself deemed to aid thorough mixing and throughout-the-tank uniformity.

As illustrated in the above examples, tanks which are commonly used for the aeration step in conventional waste treatment systems are either portions of a circular system, or rectangular tanks. In these conventional systems it is the preferred use of the present invention to distribute influent liquor along a "long" side of the tank (as distinguished from the shorter ends), e.g., along the outer circumference of a circular system segment, and to withdraw the effluent from along an opposite wall, e.g., along an inner circumference in a circular system segment. Hence, the last named most preferred embodiment is achieved in such systems by orienting the gas diffusion patterns on the bias with respect to lines drawn prependicular to the first or second opposing wall, i.e., on the bias with respect to a line which is perpendicular to the tangent at the curved wall tank.

With the thorough throughout-the-tank uniformity of the present invention, it is conceivable that some plant designer may try locating the inflows and outflows other than opposite to one another. In that event, they should be so located that there is no possibility of flowing from inflow to outflow along a relatively unagitated path such as is found along the axis of a roll. Preferably all inflow is into a fast moving area of a roll. More generally, this could be described as into a fast-moving stream which either immediately mixes turbulently or promptly carries to an area of turbulent mixing. Preferably all axial paths are interrupted, as by having a roll sweep across its end.

Liberating enough air to generate high speed in the rolls is important for best use of this invention. The speed along the surface, representing the peripheral speed of the roll should be at least about 3 feet per second, and about 4 feet per second is preferred. Preferably, the two ends of each axial area are differentially situated, as one being adjacent faster moving water than the other, to produce differential pressures causing flow through the axial area. While it is preferred that all the air injection orifices be laid out on the bias in accordance with this invention, combining bias headers with cross roll or spiral roll headers can give a greater degree of intermixing than that provided by these conventional layouts alone. It is also possible that combinations of rolls not on the bias can interact to produce a bias effect.

In accordance with this invention therefore a net result is achieved which includes the generation of a multiplicity of mild cyclonic disturbances. In accordance with this invention there is produced a swirling and rushing of the liquid from one zone into another so as to cause local cyclonic spinning, and also sometimes an overall rotation of the entire mass about vertical axes as well as about horizontal axes.

The arrows in FIG. 10 illustrate the general pattern of flow of the liquid mass. The regions marked "A" between closely adjacent headers, and the region marked "B," between neighboring zones are the approximate location of relatively vigorous cyclonic activity. Thus, one of the results of this invention is the cooperation between neighboring headers, and neighboring zones to generate cyclones as well as horizontal rolls, and to generate overall rotation in the horizontal plane around each zone of closely adjacent headers and to some extent along the entire periphery of the tank, to enhance intermingling and "complete mixing."

Another effect of the use of the aparatus of this invention is that larger proportion of the bubbles than heretofore are carried back down into the body of the aeration tank in a turbulent fashion. The quickly-saturated boundary layers (the "surfaces" of the bubbles) are continuously being broken down and re-formed as the bubbles divide and coalesce to dissolve more oxygen. Moreover the orthokinetic turbulence level is increased to a point where discrete objects having a subsidence velocity as great as 1,000 feet per hour are capable of being suspended and rapidly orbited throughout the aeration tank. An overall effect of all this is the increase of oxygenation efficiency and an increase in the effectiveness of the activated sludge seed which, because of the increased turbulence, is divided into smaller aggregates. Because of the finer particle size and the resulting increase in sorptive area, the system is maintained in conditions which are more favorable to the bacteriological and enzymatic activities because the substantially smaller particles of seed sludge are maintained oxidative throughout. Under conditions of less general ortho-kinetic turbulence relatively larger particles of seed sludge are oxidative at the surface thereof and anaerobic in the core.

Although any form of air liberation along header 75 and 76 or 100 could be used, best results are achieved using clustered clog-resistant orifices of Walker Pat. 3,153,682 with resultant concentrated air-lift columns and turbulence. Improved forms thereof have been illustrated, these being disclosed in application Ser. No. 699,524, filed Jan. 22, 1968, Dreier and Walker, which is in part a continuation of Ser. No. 581,632, filed Sept. 23, 1966. The disclosures of these applications are incorporated herein by reference.

ACHIEVEMENT

It is apparent that by feeding a unified activated sewage mixture at feed points so scattered along an activated sludge aeration tank, with high speed rolls therein, with substantially every zone of the tank being quickly reached by a portion of the inflow which has undergone turbulent mixing with the tank contents en route, the practical achieving of throughout-the-tank uniformity in large tanks is reached.

A desired standard of uniformity, attainable when this invention is fully used, is that if a tracer dye or the like is injected simultaneously at all feed points, there will after five minutes be no points in the tank except close to the feed points at which the concentration departs from the average concentration more than 10%. Some users of this invention may be satisfied if these figures are up to ten minutes and 20% respectively. Of course some aspects of the invention may be used without achieving this particular benefit.

By briefly subjecting the incoming raw sewage and return activated sludge to vigorous mixing, unified activated sewage inflow is provided so that volumetric equalizing of the flow among feed points will also achieve qualitative equalization offered.

Additionally, very vigorous premixing yields a "head start" by quickly intermixing the raw sewage and the useful organisms in the return activated sludge, together with copious oxygen. Furthermore the vigor of the premixing accomplishes maximum tearing apart or dispersion of the sewage solids and return sludge flocs for maximum effective contact between them, and for maximum effective contact of this mixture with the entire body of liquor within the tank when mixing occurs within the tank, even though this latter mixing is not, at least for the most part, quite so vigorous.

By the disposition of the elongate air-liberation headers at a substantial angle of bias to the general direction of displacement flow and to the adjacent tank walls, a diverse flow to all parts of the tank results. With enough air liberation to produce high speed rolls, and with offsetting of the ends of the rolls nearest each other, and preferably some axial spacing thereof, focal points of cyclonic or other greater than average turbulence are provided ensuring the repeated breaking up of any flocs and the penetration of oxygen and organisms to particle centers.

Thus the maximum use of the space within the tank that is theoretically possible is more closely approached than heretofore in full scale working tanks.

I claim:
1. A method of treating sewage by an activated sludge type of treatment including the steps:
   (a) subjecting the inflow of raw sewage and a continuous stream of return activated sludge for a brief substantially non-retentive period of intermixing, with mutual mixing of the solids to provide a mixed liquor;
   (b) feeding the mixed liquor at scattered feed points into an aeration tank, displacing tank contents from the tank through differently located outflow means; and
   (c) liberating air at a depth in said tanks, and along elongate patterns between laterally elongate zones dominated by air liberation in an intervening pattern to produce through said zones high speed rolling movements of the contents of the tank through its depth about horizontal axes; said patterns being so disposed as to produce diverse flow including substantial flow biased at an acute angle of 15°–75° to the line of displacement flow between feed points and outflow points, said patterns being arranged to prevent displacement flow from a feed point to an outflow point by movement along relatively non-agitated areas such as along roll axes, and being so located with respect to the feed points that substantially all zones of the tank are promptly reached by a portion of the inflowing stream after being thoroughly mixed en route with tank contents.

2. A method of treating sewage by an activated sludge type of treatment including the steps:
(a) subjecting the inflow of raw sewage and a continous stream of return activated sludge for a brief substantially non-retentive period to violent intermixing in the presence of oxygen, with thorough dispersal and mutual mixing of the solids to provide a unified and uniform mixed liquor;
(b) liberating air at a depth in said tanks, and along elongate patterns between laterally elongate zones dominated by air liberation in an intervening pattern to produce through said zones high speed rolling movements of the contents of the tank about horizontal axes; said patterns being so disposed as to produce diverse flow including substantial flow biased at an acute 15°–75° angle to the line of displacement flow between feed points and outflow points, said patterns being arranged to prevent displacement flow from a feed point to an outflow point by movement along relatively non-agitated areas such as along roll axes, and being so located with respect to the feed points that substantially all zones of a substantial length of the tank are promptly reached by a portion of the inflowing stream after being thoroughly mixed en route with tank contents.

3. In a waste-water treatment plant including an aeration vessel having an inflow and outflow, and which is capable of holding a relatively large volume of liquor, and includes means for injecting gas into the liquor at a substantial distance below the surface thereof in elongate patterns between laterally elongate zones dominated by air liberation in an intervening pattern to produce through said zones high speed rolling movements of the contents of the tank through its depth about horizontal axes; the improvement in which some of the elongate patterns and their adjacent elongate zones are on the bias of 15°–75° with respect to the general direction of displacement flow of the liquor in the vessel.

4. The improvement of claim 3 in which the patterns are oriented in said tank whereby said axes form an angle in the range of about 30–60 degrees with said general direction.

5. The improvement of claim 3 in which said patterns are oriented in said tank whereby said axes form an angle between 15 and 45 degrees with one or more of the walls of said tank.

6. The improvement of claim 3 in which the pattern constitutes a relatively small segment of a line drawn along the pattern between said opposing sides, and in which most closely adjacent patterns are spaced apart longitudinally so that a pattern does not extend into a plane which is perpendicular to a longitudinally adjacent pattern at the nearest end thereof.

7. The plant of claim 3 which includes: substantially non-retentive premixing means for simultaneously vigorously intermixing and aerating raw sewage and return activated sludge to produce an intimate sewage-sludge mixture; means including discharge means for conveying the intimate sewage-sludge mixture to the aeration tank, said discharge means being so located that the mixture is promptly and thoroughly mixed with the tank contents.

8. In an activated sludge waste-water treatment system having an aeration tank which is adapted to aerate a process liquor mixture of activated sludge and waste water by means of headers which inject air into the process liquor at a substantial distance below the surface of the liquor through a multiplicity of gas inlet orifices, the improvement in which the gas inlet orifices are grouped in a multiplicity of substantially linear patterns, said patterns and said headers being situated between zones elongate laterally of the length of the patterns and dominating said zones to generate double horizontal rolls in said liquor through said zones by the action of the gas rising therethrough, the patterns being oriented in said tank whereby the axes of the rolls formed thereby form an angle between 15 and 75 degrees with the general direction of flow of the liquor being processed, said patterns being in sufficient numbers to cause movement of the liquor in every portion of the tank.

9. In a waste-water treatment plant including an aeration vessel having an inflow and outflow, and which is capable of holding a relatively large volume of liquor, and includes means for injecting gas into the liquor at a substantial distance below the surface thereof in elongate patterns each adjacent a laterally elongated zone dominated by air liberation in that pattern to produce through said zone high speed rolling movement of the contents of the tank through its depth about a horizontal axis; the improvement in which some of the elongate patterns and their adjacent elongate zones are on the bias by an angle of 15° to 75° with respect to the nearest wall of the vessel.

10. In a waste-water treatment plant including an aeration vessel having an inflow and outflow, and which is capable of holding a relatively large volume of liquor, and includes means for injecting gas into the liquor at a substantial distance below the surface thereof in elongate patterns each adjacent a laterally elongate zone dominated by air liberation in that pattern to produce through said zone high speed rolling movement of the contents of the tank through its depth about a horizontal axis; the improvement in which some of the elongate patterns and their adjacent elongate zones are on the bias by an angle of 15° to 75° with respect to the nearest wall of the vessel;
said patterns also being arranged to provide substantial unbalance of flow action between their rolling movements and thereby set up vigorous local cyclonic-type swirling in addition to the rolling movements.

11. In a waste-water treatment plant including an aeration vessel having an inflow and outflow, and which is capable of holding a relatively large volume of liquor, and includes means for injecting gas into the liquor at a substantial distance below the surface thereof in elongate patterns each adjacent a laterally elongate zone dominated by air liberation in that pattern to produce through said zone high speed rolling movement of the contents of the tank through its depth about a horizontal axis; the improvement in which some of the elongate patterns and their adjacent elongate zones are on the bias by an angle of 15° to 75° with respect to the nearest wall of the vessel;
said patterns also being arranged to provide substantial unbalance of flow action between their rolling movements and thereby set up vigorous local cyclonic-type swirling in addition to the rolling movements;
said patterns being so located with respect to the inflow that the inflow is swept into the high speed movement, and so located that substantially all zones of a substantial length of the tank are promptly reached by a portion of the inflowing stream after being thoroughly mixed en route with tank contents.

References Cited

UNITED STATES PATENTS

| | | | |
|---|---|---|---|
| 3,396,102 | 8/1968 | Forrest | 210—15 X |
| 3,415,379 | 12/1968 | Thayer | 210—256 X |
| 3,419,146 | 12/1968 | Koulovatos | 210—195 X |

FOREIGN PATENTS 383,280  12/1964  Switzerland.

MICHAEL ROGERS, Primary Examiner

U.S. Cl. X.R.

210—14, 195, 221, 226; 261—124